US012789833B2

(12) United States Patent
Wang et al.

(10) Patent No.: US 12,789,833 B2
(45) Date of Patent: Nov. 10, 2026

(54) APPARATUSES, COMPUTER-IMPLEMENTED METHODS, AND COMPUTER PROGRAM PRODUCTS FOR CONDITION-BASED PASSENGER ASSISTANCE

(71) Applicant: HONEYWELL INTERNATIONAL INC., Charlotte, NC (US)

(72) Inventors: Fei Wang, Xi'An (CN); Bangda Zhou, Shanghai (CN); Shuai Chen, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 22 days.

(21) Appl. No.: 18/962,427

(22) Filed: Nov. 27, 2024

(65) Prior Publication Data

US 2026/0145699 A1 May 28, 2026

(51) Int. Cl.

| | |
|---|---|
| ***B60Q 1/00*** | (2006.01) |
| ***B60W 40/08*** | (2012.01) |
| ***B60W 50/16*** | (2020.01) |
| ***G01C 21/34*** | (2006.01) |
| ***G01C 21/36*** | (2006.01) |
| ***G06F 40/20*** | (2020.01) |
| *B60W 50/14* | (2020.01) |

(52) U.S. Cl.

CPC ............ *B60W 50/16* (2013.01); *B60W 40/08* (2013.01); *G01C 21/3476* (2013.01); *G01C 21/3608* (2013.01); *G01C 21/3629* (2013.01); *G01C 21/3652* (2013.01); *G06F 40/20* (2020.01); *B60W 2040/089* (2013.01); *B60W 2050/143* (2013.01); *B60W 2050/146* (2013.01); *B60W 2540/21* (2020.02); *B60W 2540/215* (2020.02); *B60W 2555/20* (2020.02); *B60W 2556/45* (2020.02)

(58) Field of Classification Search

CPC ................. B60W 50/16; B60W 40/08; B60W 2040/089; B60W 2050/143; B60W 2050/146; B60W 2540/21; B60W 2540/215; B60W 2555/20; B60W 2556/45; G01C 21/3476; G01C 21/3608; G01C 21/3629; G01C 21/3652; G06F 40/20

USPC ........................................................ 340/425.5

See application file for complete search history.

(56) References Cited

U.S. PATENT DOCUMENTS

| | | | | |
|---|---|---|---|---|
| 12,020,583 B2 * | 6/2024 | Mast | ...................... | G05D 1/101 |
| 2003/0048203 A1 * | 3/2003 | Clary | ...................... | G01C 23/00 340/963 |
| 2008/0039988 A1 * | 2/2008 | Estabrook | ............. | G01C 23/00 701/14 |

(Continued)

*Primary Examiner* — Tai T Nguyen

(74) *Attorney, Agent, or Firm* — Alston & Bird LLP

(57) ABSTRACT

Embodiments of the disclosure provide for improving passenger assistance. In the context of a method, the method includes obtaining vehicle data associated with operation of a vehicle; determining the vehicle data satisfies one of a plurality of conditions stored in at least one data store, wherein: respective subsets of the plurality of conditions are associated with one of a plurality of categories comprising emergency, precaution, and entertainment; and causing at least one computing device in a passenger portion of the vehicle to output at least one predefined media element based at least in part on the condition satisfied by the vehicle data and one of the plurality of categories that is associated with the condition.

20 Claims, 6 Drawing Sheets

(56) References Cited

U.S. PATENT DOCUMENTS

| | | | | |
|---|---|---|---|---|
| 2008/0303660 | A1* | 12/2008 | Lombardi | G08G 1/0965<br>340/540 |
| 2010/0063655 | A1* | 3/2010 | Bacabara | G08G 5/21<br>701/16 |
| 2012/0208492 | A1* | 8/2012 | Tschofenig | H04L 51/222<br>455/404.2 |
| 2013/0297102 | A1* | 11/2013 | Hughes | G05D 1/0083<br>701/3 |

* cited by examiner

APPARATUSES, COMPUTER-IMPLEMENTED METHODS, AND COMPUTER PROGRAM PRODUCTS FOR CONDITION-BASED PASSENGER ASSISTANCE

TECHNOLOGICAL FIELD

Embodiments of the present disclosure are generally directed to providing passenger assistance and direction.

BACKGROUND

Typical approaches to passenger assistance rely upon human operators. For example, in an aerial context, human flight attendants carry out passenger assistance duties, such as explaining entertainment options or alerting passengers as to precautionary and emergency measures. However, vehicles may lack means for accommodating human crew members dedicated to fulfilling such tasks. For example, vehicles may be staffed by a single human pilot with limited or no bandwidth to inherit and perform passenger assistance duties, especially in emergency scenarios. As another example, vehicles may be automatically or remotely operated and, therefore, lack onboard crewmembers for performing passenger assistance. As a result, passenger safety and comfort may be compromised.

Applicant has discovered various technical problems associated with providing assistance to vehicle passengers. Through applied effort, ingenuity, and innovation, Applicant has solved many of these identified problems by developing the embodiments of the present disclosure, which are described in detail below.

BRIEF SUMMARY

In general, embodiments of the present disclosure herein provide for condition-based passenger assistance. For example, embodiments of the present disclosure are configured to determine satisfaction of predefined conditions based at least in part on vehicle data, operator commands, and/or the like. The various embodiments of the present disclosure may cause output of media elements in a passenger portion of the vehicle such that vehicle passengers are informed or instructed in accordance with the detected condition. The various conditions may be associated with different categories such that media elements may be prioritized (e.g., outputted or suppressed) on a basis of criticality to passenger safety. For example, embodiments of the present disclosure may determine satisfaction of entertainment-related conditions, precaution-related conditions, and emergency-related conditions. The output of media elements for co-occurring conditions may be configured to prioritize emergency-related conditions over precaution- or entertainment-related conditions, and precaution-related conditions over entertainment-related conditions. The media elements may include audio elements, visual elements, tactile elements, and/or the like, and may be outputted via speakers, displays, haptic mechanisms, and/or the like. Other implementations for conditional passenger assistance will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for improved passenger assistance is provided. The computer-implemented method is executable utilizing any of a myriad of computing device(s) and/or combinations of hardware, software, firmware. In some example embodiments an example computer-implemented method includes obtaining vehicle data associated with operation of a vehicle; determining the vehicle data satisfies one of a plurality of conditions stored in at least one data store, wherein: respective subsets of the plurality of conditions are associated with one of a plurality of categories comprising emergency, precaution, and entertainment; and causing at least one computing device in a passenger portion of the vehicle to output at least one predefined media element based at least in part on the condition satisfied by the vehicle data and one of the plurality of categories that is associated with the condition.

In some embodiments, the at least one predefined media element comprising at least one audio element. In some embodiments, the at least one predefined media element comprising at least one visual element. In some embodiments, the predefined media element comprises at least one tactile element. In some embodiments, the predefined media element comprises at least one audio element and at least of a visual element or a tactile element. In some embodiments, the vehicle data comprises an operator command obtained from a computing device in a remaining portion of the vehicle that is separate from the passenger portion of the vehicle. In some embodiments, the method further comprises receiving, from the computing device in the remaining portion of the vehicle, an audio recording of the remaining portion of the vehicle, the audio recording comprising an utterance from an operator of the vehicle; and generating, via natural language processing, the operator command based at least in part on the audio recording.

In some embodiments, the method further comprises determining the vehicle data satisfies at least a first condition and a second condition, wherein: the first condition is associated with an emergency category; the second condition is associated with at least one of a precaution category or an entertainment category; and the at least one data store further comprises a ranking of the plurality of categories by priority, a top-ranked entry of the ranking comprising the emergency category; and causing the at least one computing device to output a predefined media element associated with the first condition based at least in part on the ranking. In some embodiments, the vehicle data comprises a vehicle status. In some embodiments, the vehicle status comprises a current location of the vehicle and a travel pathway comprising at least one point of interest (POI) location. In some embodiments, the method further comprises determining the one of the plurality of conditions is satisfied in response to a determination that the current location of the vehicle is within a threshold range of a respective POI location. In some embodiments, the at least one predefined media element comprises at least one of an auditory output or a visual output indicating the POI location relative to the current location of the vehicle.

In some embodiments, the at least one computing device in the passenger portion of the vehicle comprises a plurality of computing devices distributed throughout the passenger portion. In some embodiments, the method further comprises: determining a subset of the passenger portion of the vehicle from which the POI location is observable; determining a subset of the plurality of computing devices associated with the subset of the passenger portion of the vehicle; and limiting output of the at least one predefined media element to the subset of the plurality of computing devices. In some embodiments, the method further comprises obtaining the vehicle status from at least one system aboard the vehicle, wherein: the vehicle status comprises a weather report; the one of the plurality of conditions comprises wind shear; and the category comprises emergency.

In some embodiments, the vehicle data comprises an operator command. In some embodiments, the method further comprises causing rendering of a graphical user interface (GUI) on a display of a computing device in an operator portion of the vehicle, the GUI comprising at least one selectable field; and receiving the operator command from the computing device in the operator portion of the vehicle, wherein the operator command is based at least in part on a user input to the GUI. In some embodiments, the condition is associated with the category of emergency or the category of precaution. In some embodiments, the method further comprises suspending output of a predefined media element that is associated with a second condition based at least in part on the second condition being associated with the category of entertainment.

In some embodiments, the method further comprises generating at least a subset of the plurality of conditions based at least in part on a travel pathway associated with the vehicle. In some embodiments, the travel pathway comprises at least one POI location. In some embodiments, the method further comprises receiving the vehicle data from an external system located outside of the vehicle. In some embodiments, the external system comprises at least one of a remote weather service, a vehicle traffic system, a radar system, or a second vehicle.

In accordance with another aspect of the present disclosure, a computing apparatus for improved passenger assistance is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for improved passenger assistance is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
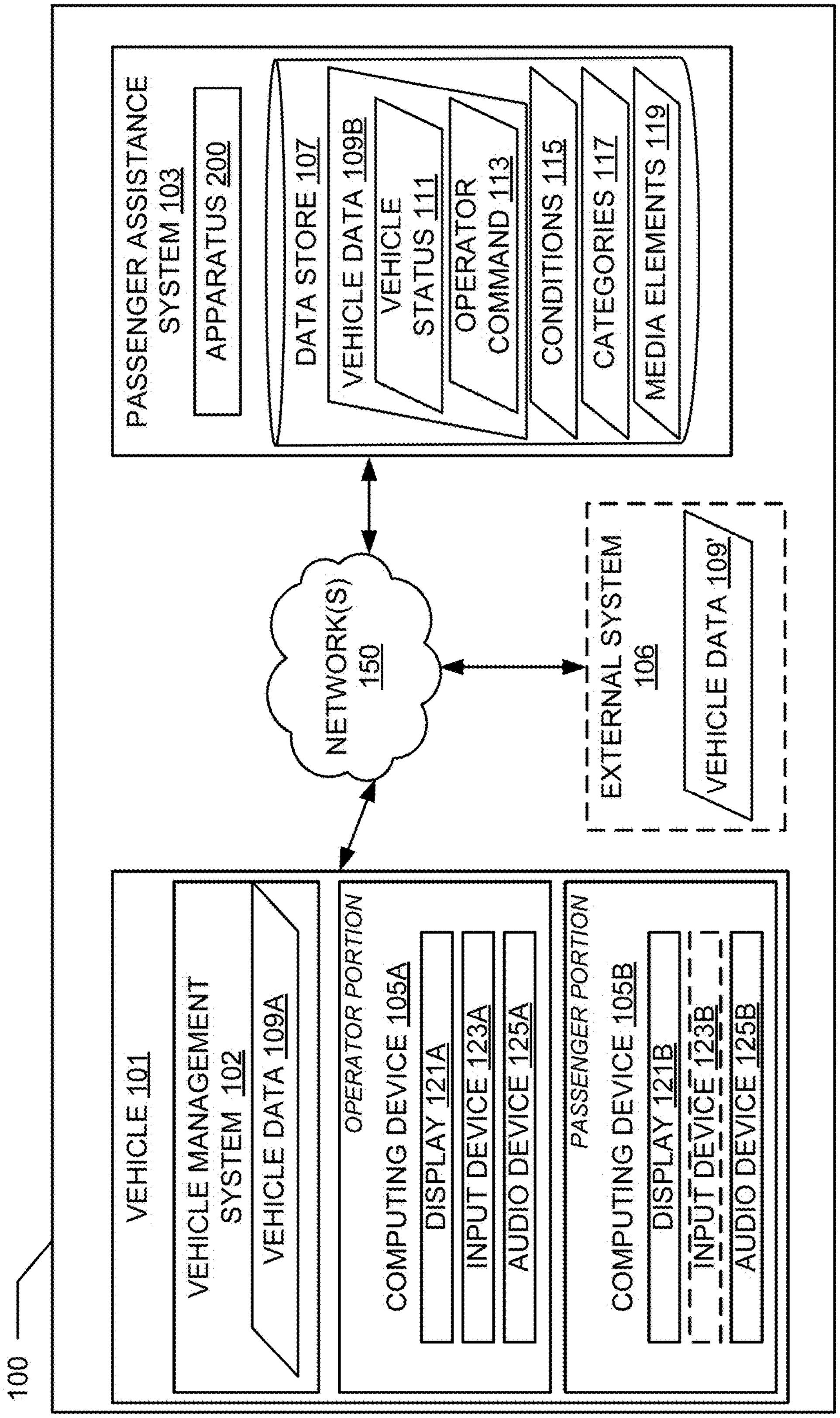

Having thus described the embodiments of the disclosure in general terms, reference now will be made to the accompanying drawings, which are not necessarily drawn to scale, and wherein:

FIG. 1 illustrates a block diagram of a network environment that may be specially configured within which embodiments of the present disclosure may operate.

Figure 2:
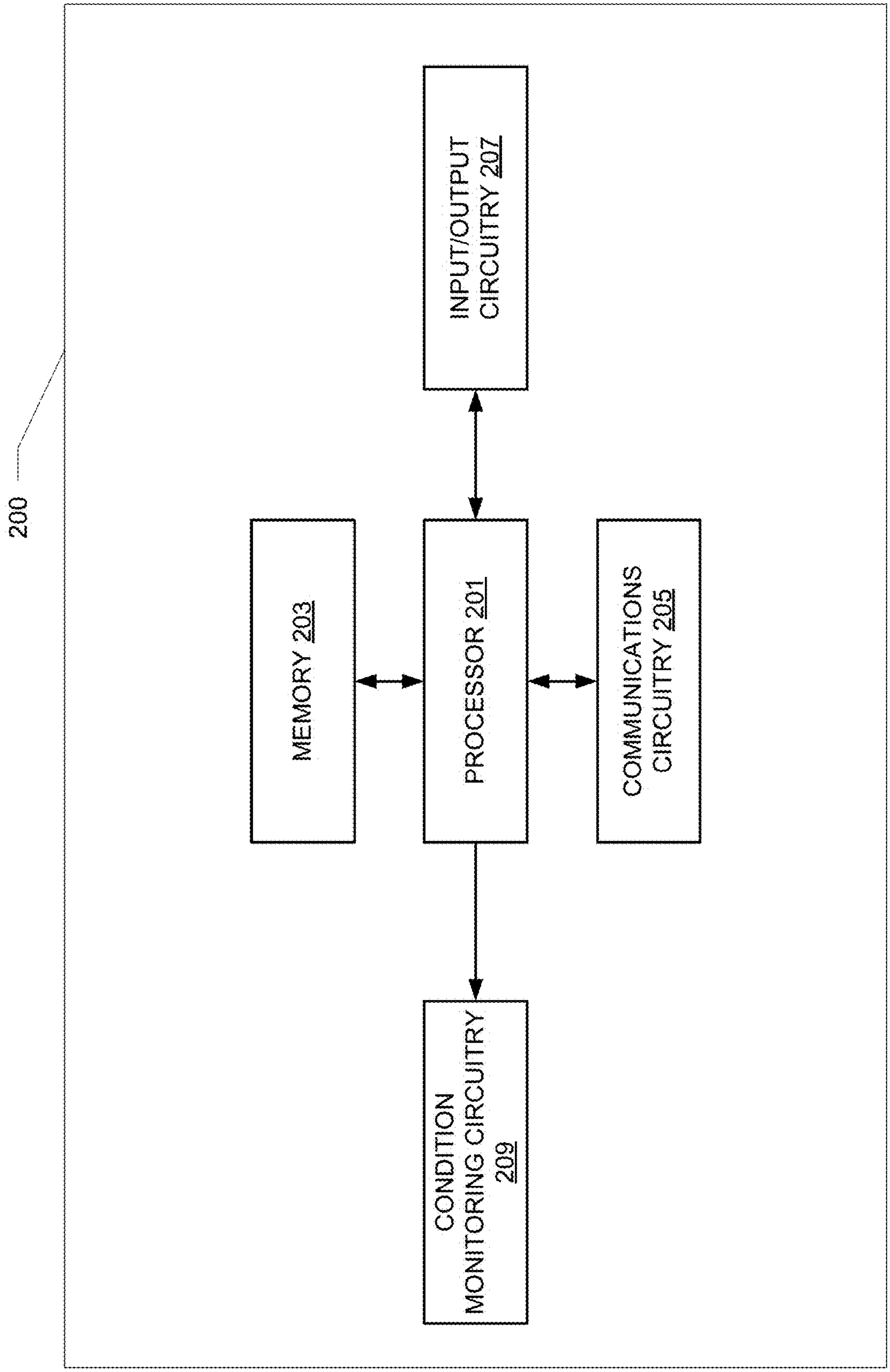

FIG. 2 illustrates a block diagram of an example apparatus that may be specially configured in accordance with at least some example embodiments of the present disclosure.

Figure 3:
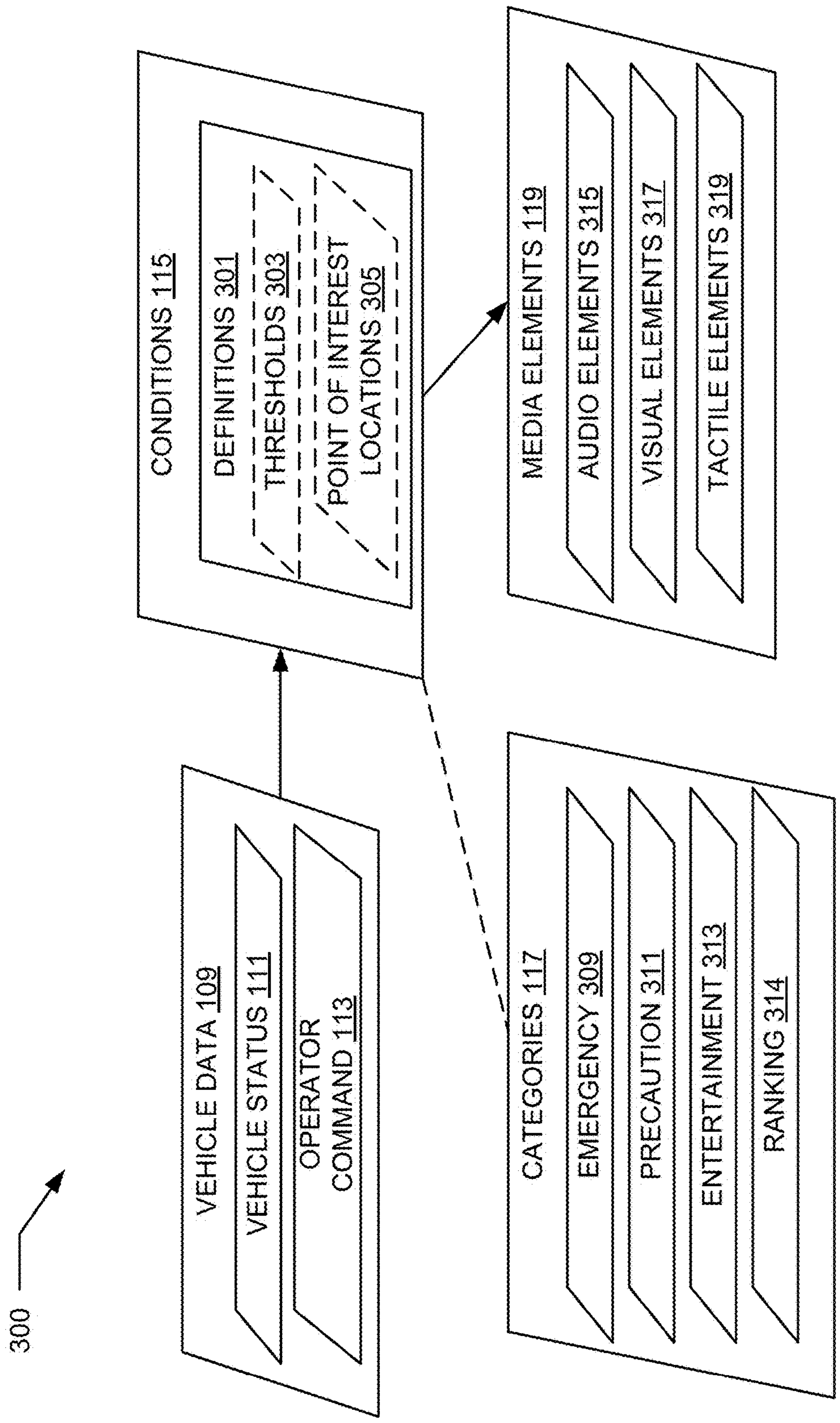

FIG. 3 illustrates an example data architecture in accordance with at least some example embodiments of the present disclosure.

Figure 4:
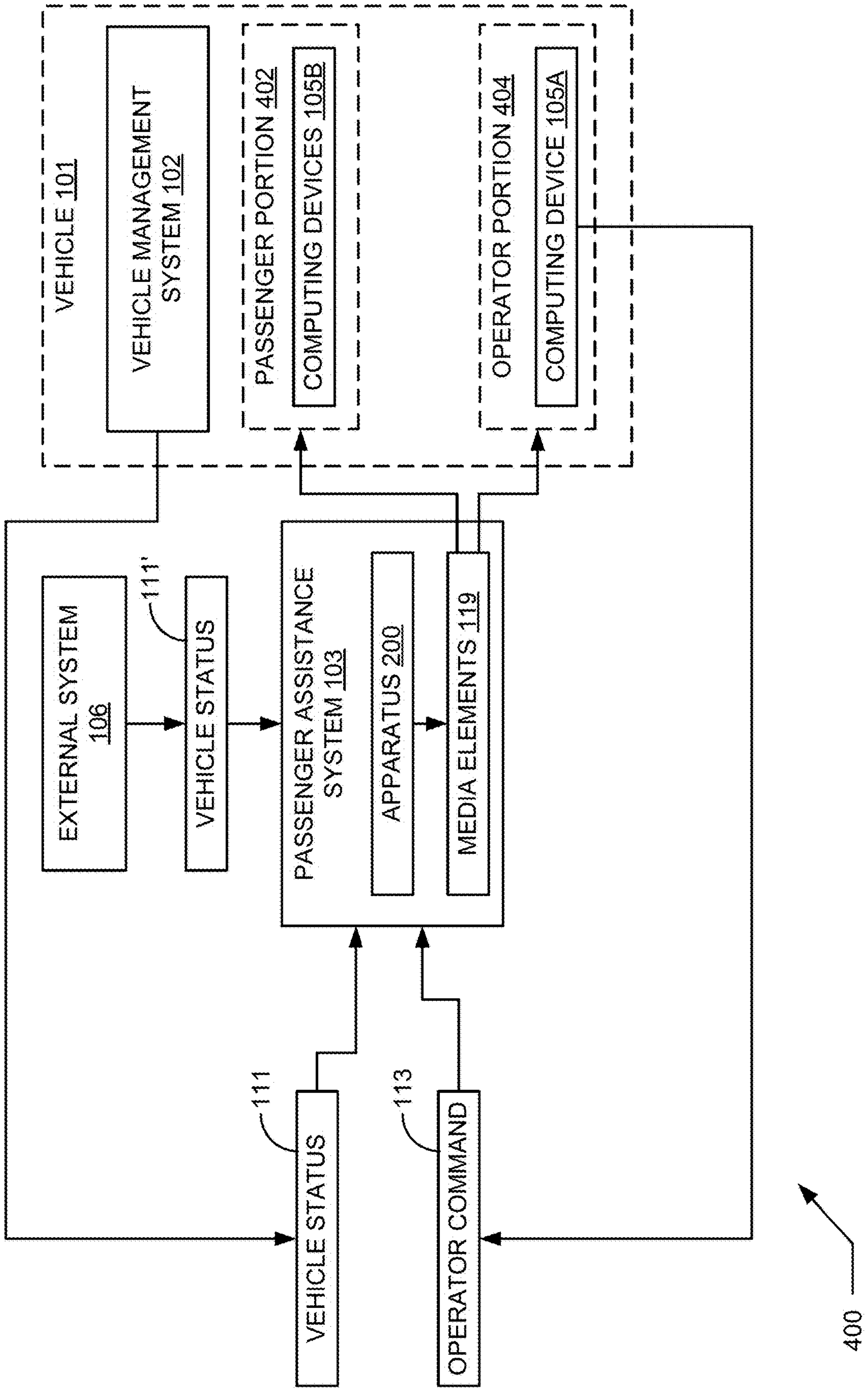

FIG. 4 illustrates an example workflow for conditional passenger guidance in accordance with at least some example embodiments of the present disclosure.

Figure 5:
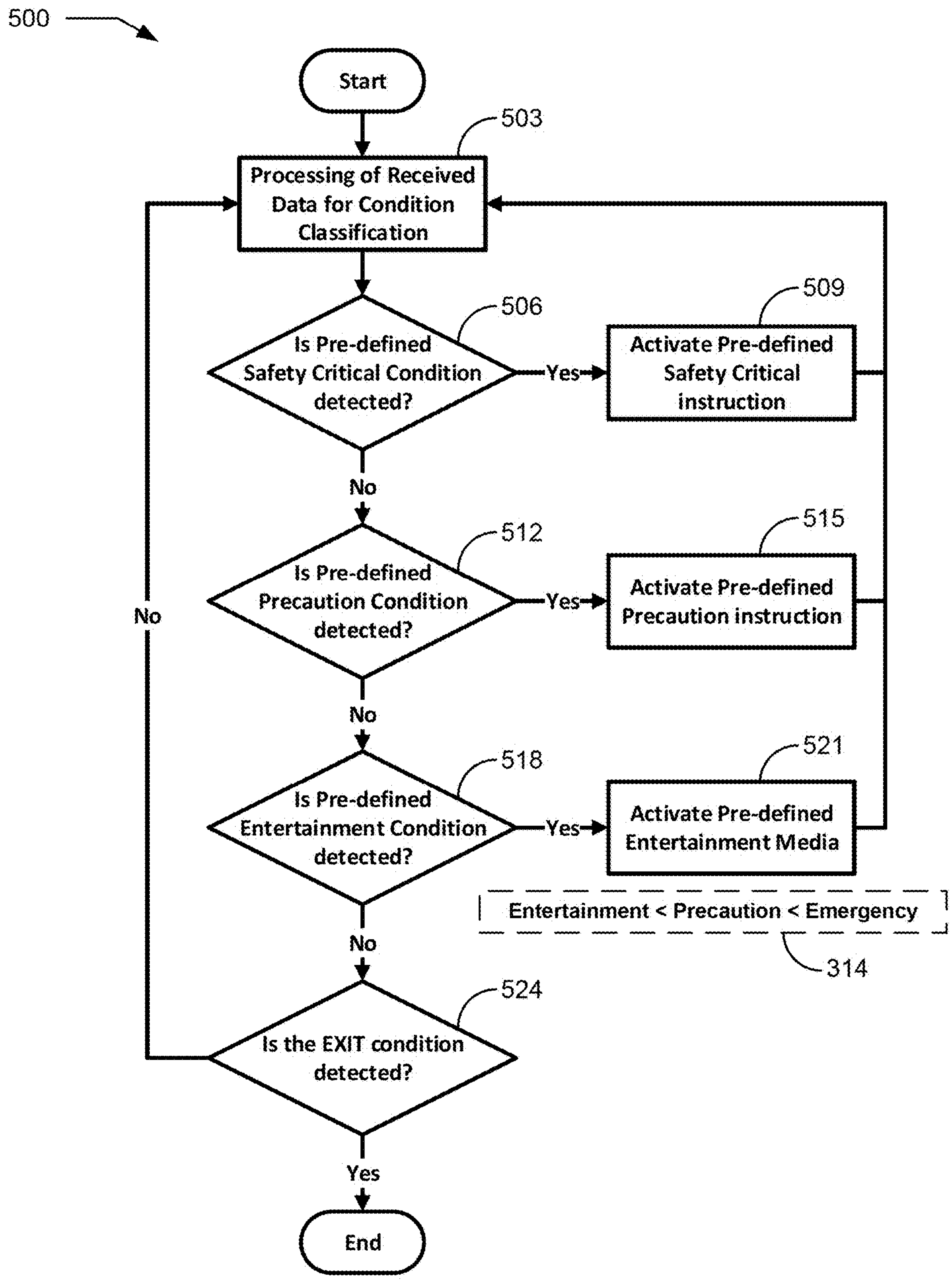

FIG. 5 illustrates an example sequence of conditional passenger guidance in accordance with at least some example embodiments of the present disclosure.

Figure 6:
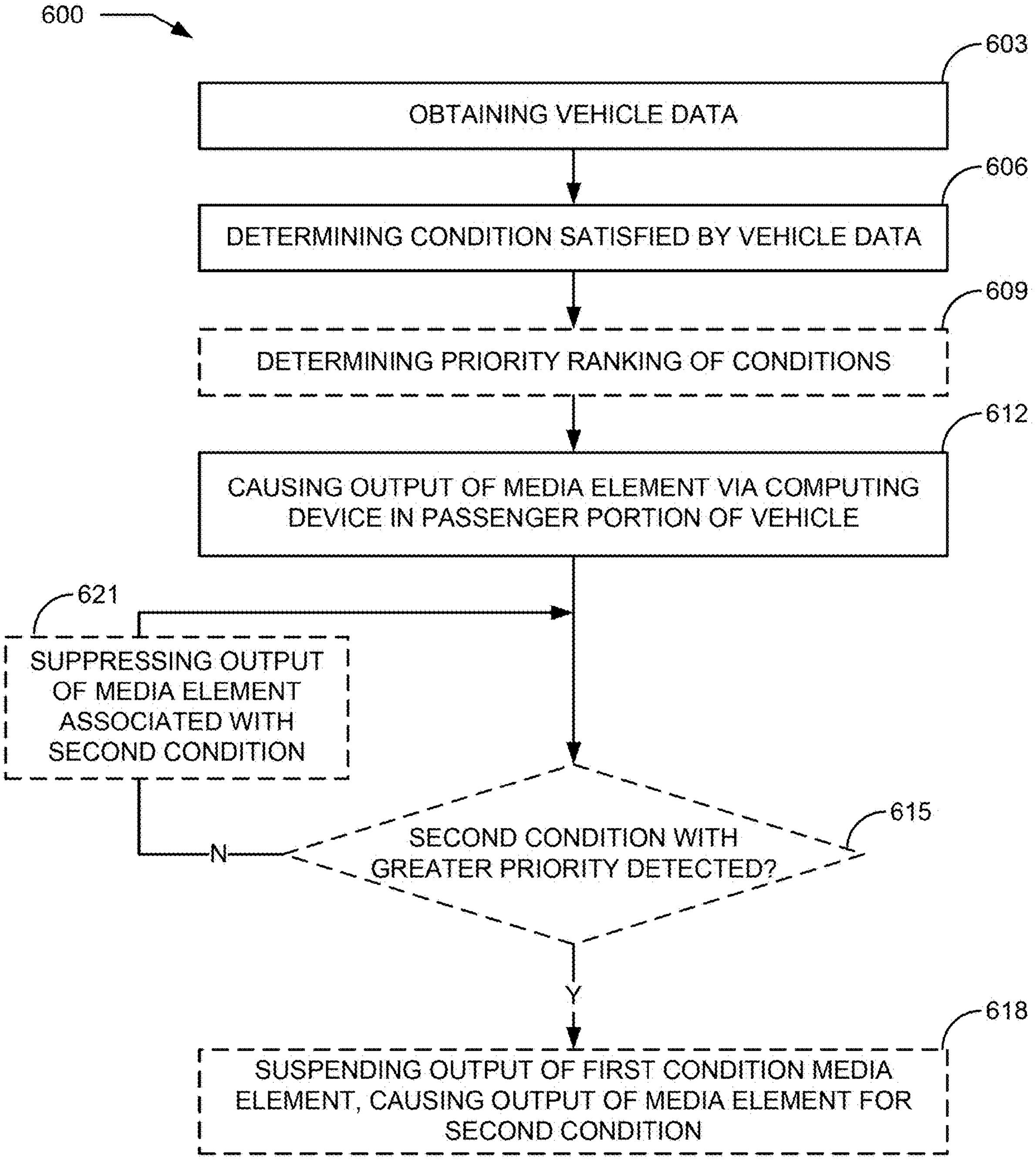

FIG. 6 illustrates a flowchart depicting operations of an example process for providing conditional passenger guidance in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of automated passenger assistance. Typically, passenger assistance is provided by one or more human crewmembers. For example, a vehicle may be staffed with attendants responsible for explaining safety information to passengers and directing passengers through safety precaution and emergency measures. However, some vehicles may lack capacity to accommodate dedicated human staff for assuming such responsibilities. Accordingly, existing approaches may allocate passenger guidance an operator of the vehicle. Vehicle operators may lack bandwidth to both assist passengers and safely monitor and control the vehicle. As a result, the workload of the operator may become excessive, potentially reducing quality and scope of passenger assistance and safety of vehicle operation. Additionally, some vehicles may be pilotless or remotely piloted such that passenger assistance tasks cannot be assumed by a vehicle operator.

Embodiments of the present disclosure overcome the technical challenges of providing passenger assistance by monitoring vehicle data for satisfaction of one or more conditions and causing output of media elements to a passenger portion of a vehicle in accordance with a satisfied condition. For example, the present methods, apparatuses, and computer program products may obtain vehicle data (e.g., vehicle statuses, operator commands, and/or the like) from one or more sources including onboard systems and sensors, external systems, operator computing devices, passenger computing devices, and/or the like. The methods, apparatuses, and computer program products may determine whether the vehicle data satisfies respective criteria for one or more conditions. In this manner, observational workloads may be offloaded away from the vehicle operator. Further, whereas a human assistant may be limited to responding to a single condition, the methods, apparatuses, and computer program products may detect and respond to multiple different conditions simultaneously, thereby providing an increase to passenger assistance throughput and specificity.

In various embodiments, the methods, apparatuses, and computer program products are configured to respond to conditions on a priority basis. For example, output of respective media elements for co-occurring conditions may be performed based at least in part on respective categories of the conditions. The methods, apparatuses, and computer program products may prioritize the output of media elements for emergency-related conditions over output of media elements for precaution- or entertainment-related conditions. In doing so, the method, apparatus, and computer program product may prioritize mitigation of hazards most critical to passenger safety. Further, by automating passenger assistance measures, the present techniques may overcome disadvantages of reducing or eliminating onboard vehicle crews.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, and/or the like. In some embodiments, the vehicle is piloted by a human operator onboard the vehicle. For example, in an aerial context, the vehicle may be a commercial airliner operated by a flight crew. In some embodiments, the vehicle is remotely controllable such that a remote operator may initiate and direct movement of the vehicle. Additionally, in some embodiments, the vehicle is unmanned. For example, the vehicle may be a powered, aerial vehicle that does not carry a human operator and is piloted by a remote operator using a control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with advanced air mobility (AAM).

"AAM" refers to advanced air mobility, which includes all aerial vehicles and functions for aerial vehicles that are capable of performing vertical takeoff and/or vertical landing procedures. Non-limiting examples of AAM aerial vehicles include passenger transport vehicles, cargo transport vehicles, small package delivery vehicles, unmanned aerial system services, autonomous drone vehicles, and ground-piloted drone vehicles, where any such vehicle is capable of performing vertical takeoff and/or vertical landing.

"Media element" refers to any visual, auditory, or tactile effect that may be provided to a human subject to instruct or inform the human subject. For example, a media element may include program files associated with processing, storing, and outputting audible sounds, images, videos, animations, haptics, and/or the like.

Example Systems and Apparatuses of the Disclosure

FIG. 1 illustrates a block diagram of a network environment that may be specially configured within which embodiments of the present disclosure may operate. Specifically, FIG. 1 depicts an example networked environment 100. As illustrated, the networked environment 100 includes one or more vehicles 101, a passenger assistance system 103, and, optionally, one or more external systems 106. In some embodiments, the passenger assistance system 103 is external to the vehicle 101. For example, the passenger assistance system 103 may include a remote computing environment in communication with the vehicle 101. In some embodiments, the vehicle 101 comprises all or a portion of the passenger assistance system 103.

In various embodiments the passenger assistance system 103 is configured to supplement human passenger assistants and reduce operator workload in managing passenger portions of a vehicle 101. In doing so, the passenger assistance system 103 may support single pilot operation (SVO) and simplified vehicle operation (SVO). In some embodiments, the passenger assistance system 103 is configured to output guidance and information to passengers on a conditional basis with priority ranks. In this manner, the passenger assistance system 103 may transition between providing passengers with entertainment-related information, precautionary guidance, and safety-critical instructions.

In some embodiments, the vehicle 101 includes an operator portion configured to accommodate one or more operators and which is separated from a passenger portion by spacing and/or vehicle infrastructure (e.g., doors, windows, walls, and/or the like). For example, the vehicle 101 may include a cockpit, wheelhouse, helm, and/or the like. In some embodiments, the operator portion includes one or more computing devices 105A by which vehicle data 109A may be received and provisioned to the passenger assistance system 103. For example, the computing device 105A may be configured to receive user inputs that define vehicle statuses 111, operator commands 113, and/or the like. The passenger assistance system 103 may be configured to receive the vehicle statuses 111, operator commands 113, and/or the like from the computing device 105A and carry out functionality described herein to automatically provide passenger assistance based at least in part on one or more conditions 115 that are determined to be satisfied. The computing device 105A may be located in a remaining portion of the vehicle 101 that is separate from the passenger portion of the vehicle.

In some embodiments, the computing device 105A includes one or more displays 121A on which graphical user interfaces (GUIs) and other information related to vehicle operation, passenger assistance, and/or the like, may be rendered. In some embodiments, the display 121A includes a CRT (cathode ray tube), LCD (liquid crystal display) monitor, LED (light-emitting diode) monitor, and/or the like, for displaying information/data to an operator of a vehicle 101. In some embodiments, the computing device 105A includes one or more input devices 123A for receiving user inputs. For example, the input device 123A may receive operator commands associated with conditions 115. The input device 123A may include any number of devices that enable human-machine interface (HMI) between an operator of the vehicle and the passenger assistance system 103. In some embodiments, the input device 123A includes one or more buttons, cursor devices, joysticks, touch screens, including three-dimensional or pressure-based touch screens, camera, finger-print scanners, accelerometer, retinal scanner, gyroscope, magnetometer, or other input devices. In some embodiments, the input device 123A includes one or more vehicle controls (e.g., joysticks, thumbsticks, yokes, steering wheels, accelerator control, thrust control, brake control, and/or the like) that enable an operator to control and navigate the vehicle 101.

In some embodiments, the computing device 105A includes one or more audio devices 125A configured to receive and record audio within a remaining portion of the vehicle that is outside of the passenger portion, such as the operator portion of the vehicle 101. For example, the audio device 125A may be configured to record utterances of an operator of the vehicle 101. In such contexts, the audio device 125A, passenger assistance system 103, and/or the like may process the recorded utterances via one or more natural language modules to generate one or more vehicle statuses 111, operator commands 113, and/or the like. Additionally, or alternatively, in some embodiments, the audio device 125A is configured to output audible media elements 119 to the operator of the vehicle 101. For example, the audio device 125A may output audio media elements 119 that are indicative of activities of the passenger assistance system 103, such as indications of conditions determined to be satisfied, priority rankings of conditions, media elements being outputted to a passenger portion of the vehicle 101, and/or the like.

In various embodiments, the vehicle 101 includes a passenger portion configured to accommodate one or more passengers. For example, the vehicle 101 may include a seating area, cabin, deck, and/or the like that is allocated for holding passengers. In some embodiments, the passenger portion includes one or more computing devices 105B configured to output media elements 119 to one or more passengers. In some embodiments, the computing devices 105A, 105B may be handheld devices, seat-mounted devices, wall-mounted devices, ceiling-mounted devices, window-mounted devices, passenger or operator wearable devices, and/or the like. In various embodiments, a computing device 105B or computing device 105A include mobile devices, smartphones, tablets, phablets, kiosks, smart displays, speakers, Internet of Things (IoT) devices, smart appliances, and/or the like.

The vehicle 101 may include multiple different computing devices 105B configured to provide various formats of media elements 119, such as audible media, visual media, tactile media, and/or the like. In some embodiments, the computing device 105B is configured to receive media elements 119 from the passenger assistance system 103. For example, the computing device 105B may receive images, videos, audio, haptics instructions, and/or the like from the passenger assistance system 103 for outputting to passengers.

In some embodiments, the computing device 125B includes one or more displays 121B on which GUIs and other information related to passenger assistance may be rendered. In some embodiments, the display 121B includes a CRT, LCD monitor, LED monitor, and/or the like, for displaying information/data to vehicle passengers. In some embodiments, the passenger portion includes a plurality of computing devices 125B comprising displays 121B such that visual media may be outputted to all or a subset of passengers in the passenger portion (e.g., individual seats, seat rows, seat columns, and/or the like). In various embodiments, the computing device 125B includes one or more audio devices 125B configured to output audible media elements to passengers. For example, the audio device 125B may include one or more speakers by which audio may be outputted to the passenger portion of the vehicle or subsets of the passenger portion, such as individual seats, seat rows, seat columns, and/or the like.

In some embodiments, the computing device 105B optionally includes one or more input devices 123B for receiving user inputs. For example, the input device 123A may receive user inputs for requesting passenger assistance (e.g., entertainment guidance, precautionary safety information, emergency assistance, and/or the like). The input device 123B may include any number of devices that enable HMI between a passenger and the passenger assistance system 103. In some embodiments, the input device 123B includes one or more buttons, cursor devices, joysticks, touch screens, including three-dimensional or pressure-based touch screens, camera, finger-print scanners, accelerometer, retinal scanner, gyroscope, magnetometer, or other input devices. For example, the input device 123B may include a touchscreen by which a passenger may provide user inputs for requesting assistance from the passenger assistance system 103.

In some embodiments, the vehicle 101 includes a vehicle management system 102 configured to generate or obtain vehicle data 109A, 109' that is indicative of operation of the vehicle 101. Additionality, in some embodiments, the vehicle management system 102 is configured to control the vehicle 101. The vehicle management system 102 may include any number of computing device(s) and/or other system(s) embodied in hardware, software, firmware, and/or the like. For example, the vehicle management system 102 may include one or more vehicle controls (e.g., rotor speed, rotor orientation, thrust, brakes, flaps, and/or the like). In some embodiments, the vehicle management system 102 includes an autopilot and/or the like that automatically controls the vehicle 101. The autopilot may be embodied in firmware, software, hardware, and/or the like such that the vehicle management system 102 may autonomously navigate the vehicle 101. Additionally, or alternatively, in some embodiments, the vehicle management system 102 is configured to execute control commands received from a remote computing environment, such as a ground station.

In some embodiments, the vehicle management system 102 includes one or more vehicle recording systems configured to obtain and report one or more aspects of the vehicle or operation thereof. For example, the vehicle management system 102 may include a transponder, data uplink system, traffic collision avoidance system (TCAS), automatic dependent surveillance-broadcast (ADS-B), flight recorder, and/or the like. In some embodiments, the vehicle management system 102 is configured to receive vehicle data 109' from one or more external systems. In some embodiments, the vehicle management system 102 includes or is in communication with one or more sensors of the vehicle 101. For example, the vehicle management system 102 may include or communicate with image sensors, pressure sensors, temperature sensors, audio sensors, accelerometers, gyroscopes, magnetometers, inertial measurement units, and/or the like. In various embodiments, the vehicle management system 102 includes one or more sensors, systems, and/or the like configured to determine a physical position of the vehicle 101. For example, the vehicle management system 102 may include one or more satellite-based positioning systems configured to generate a geographic orientation of a vehicle, such as a GPS module.

In some embodiments, the vehicle management system 102 is configured to obtain images, videos, audio recordings, and/or the like of the passenger portion, the operator portion, and/or the like. In various embodiments, the vehicle management system 102 is configured to provision vehicle data 109A comprising images, videos, audio recordings, and/or the like to the passenger assistance system 103. In this manner, the passenger assistance system 103 may determine whether one or more conditions 115 are satisfied based at least in part on the images, videos, audio recordings, and/or the like.

In various embodiments, the external system 106 includes any system that is external to the vehicle 101 and configured to generate vehicle data 109' indicative of operation of the vehicle 101. For example, the external system 106 may include radar systems, weather alert systems, vehicle traffic systems, ground stations, other vehicles 101, and/or the like, that are located outside of the vehicle 101. In some embodiments, the external system 106 is configured to provision vehicle data 109' to the passenger control system 103, vehicle management system 102, computing device 105A, computing device 105B, and/or the like. For example, the external system 106 may provision weather reports, vehicle traffic reports, location-specific tourism information, and/or the like to the passenger control system 103.

In some embodiments, the passenger assistance system 103 includes an apparatus 200 configured to perform various functions and actions related to enacting techniques and processes described herein for providing conditional passenger assistance. For example, the apparatus 200 may determine a condition 115 that is satisfied by vehicle data 109B and obtain a media element 119 that is associated with the satisfied condition. The apparatus 200 may cause outputting of the media element 119 to the passenger portion of the vehicle 101. In some embodiments, the passenger assistance system 103 includes one or more data stores 107. The various data in the data store 107 may be accessible to one or more of the apparatus 200, the vehicle management system 102, the operator computing device 105A, the passenger computing device 105B, and/or the like. The data store 107 may be representative of a plurality of data stores 107 as can be appreciated. The data stored in the data store 107, for example, is associated with the operation of the various applications, apparatuses, and/or functional entities described herein. The data stored in the data store 107 may include, for example, vehicle data 109B, conditions 115, categories 117, media elements 119, and/or the like.

In some embodiments, the apparatus 200 is configured to obtain the vehicle data 109B from the vehicle management system 102, one or more operator computing devices 105A, one or more passenger computing devices 105B, one or more external systems 106, and/or the like. In various embodiments, the vehicle data 109B includes any data associated with the operator or operation of the vehicle 101. In some embodiments, the vehicle data 109B includes vehicle statuses 111, operator commands 113, and/or the like. In some embodiments, the vehicle status 111 includes readings from one or more sensors or systems aboard the vehicle 101. For example, the vehicle status 111 may include temperatures, pressures, humidity levels, oxygen levels, carbon dioxide levels, and/or the like of the vehicle exterior or vehicle interior, such as within the operator portion, passenger portion, and/or the like. As another example, the vehicle status 111 may include images, videos, audio recordings, and/or the like of the vehicle exterior or vehicle interior. As another example, the vehicle status 111 may include measurements of vehicle speed, acceleration, ascension, descension, pitch, turning rate, bank angle, and/or the like. In some embodiments, a vehicle status 111 includes a metric of difference between a sensor measurement and a predetermined threshold, such as a target value, target range, limit, and/or the like.

In some embodiments, a vehicle status 111 includes a physical location of the vehicle 101, a proximity of the vehicle 101 to one or more physical locations (e.g., destinations, points of interest (POIs), and/or the like), a proximity of the vehicle 101 to other vehicles, and/or the like. In some embodiments, a vehicle status 111 includes a phase or progression of the vehicle 101 along a travel pathway. For example, the vehicle status 111 may include taxi, takeoff, ascent, cruising, pre-descent, descent, landing, arrival, and/or the like. In some embodiments, a vehicle status 111 includes presence of turbulence conditions or the forecasting of turbulent conditions (e.g., wind shear, mechanical turbulence, thermal turbulence, frontal turbulence, and/or the like). Additionally, or alternatively, a vehicle status 111 includes present or forecasted weather (e.g., winds, precipitation, temperature, fog, smog, dust), and/or the like.

In some embodiments, a vehicle status 111 includes one or more activities occurring onboard the vehicle 101. For example, the vehicle status 111 may include onboard passenger disturbances (e.g., disputes, unruliness, smoking, and/or the like), passenger or vehicle operator health events, and/or the like. As another example, the vehicle status 111 may include unauthorized use of emergency devices (e.g., emergency exits, rafts, masks, and/or the like). As another example, the vehicle status 111 may include failure or malfunction of one or more vehicle systems, such as elements of the vehicle management system 102, engines, landing gear, environmental regulation systems, restroom facilities, and/or the like.

In various embodiments, an operator command 113 includes directives, instructions, selections, and/or the like inputted by an operator of the vehicle 101. In such contexts, the operator of the vehicle 101 may be onboard or remote from the vehicle 101. For example, the operator of the vehicle 101 may be an operator of a ground station configured to remotely monitor and control the vehicle 101. Additionally, or alternatively, the operator of the vehicle 101 may be an autonomous computing resource, such as a vehicle-local, vehicle-remote, or hybridized autopilot. In some embodiments, an operator command 113 comprises natural language text, a selection of a GUI element (e.g., field, slider, button, and/or the like), an uttered word or key phrase, a gesture, and/or the like.

An operator command 113 may be associated with informing or instructing vehicle passengers. For example, an operator command 113 may include an instruction to alert and prepare passengers for a forecasted event (e.g., turbulence, adverse weather, and/or the like). As another example, an operator command 113 may include an instruction to alert and prepare passengers as to a failure or malfunction of a vehicle component or system. In another example, an operator command 113 may include an instruction to warn and prepare passengers for a steering maneuver, velocity change, acceleration change, and/or the like.

In some embodiments, an operator command 113 includes a condition identifier that identifies a condition 115, a category identifier that identifies a category 117, and/or the like. For example, the apparatus 200 may cause rendering of a GUI on a display 121A of an operator computing device 105B. The GUI may include a plurality of fields associated with different conditions 115 including vehicle ascending, vehicle descending, vehicle turning, turbulence, critical failure, and/or the like. In response to receiving a user input selecting a particular field, the apparatus 200 may receive from the computing device 105A an operator command comprising an identifier for the condition 115 with which the selected field is associated.

In some embodiments, conditions 115 include respective definitions for phenomena that may be experienced by a vehicle 101, vehicle operator, vehicle passenger, and/or the like. The respective definitions may include criteria for determining the presence of the phenomenon within the context of vehicle data 109A, 109B, 109'. For example, a condition 115 may be associated with "shock" and include criteria for determining that the vehicle 101, passengers, operator, and/or the like are experiencing or will experience turbulence. In such contexts, the criteria may include threshold levels of vibration or acceleration change, receipt of adverse weather or clear air turbulence (CAT) alerts, receipt of particular operator commands 113, and/or the like. As another example, a condition 115 may be associated with "point of interest (POI) guide" and include criteria for determining that the vehicle 101 is within a predetermined proximity of a POI location, a side of the vehicle 101 from which a POI is observable, and/or the like. In some embodiments, respective conditions 115 are associated with different predefined media elements 119, which may be outputted in response to a determination that vehicle data satisfies the condition 115.

In some embodiments, conditions 115 are associated with respective categories 117. In some embodiments, the categories 117 indicate a priority level of the condition 115 such that the apparatus 200 may determine whether to initiate or suppress output of media elements 119 for co-occurring conditions 115. For example, a first condition 115 for "POI alert" may be associated with an entertainment category, a second condition 115 for "making turn" may be associated with a precautionary category, and a third condition 115 for "control loss" may be associated with an emergency category. In such contexts, the emergency category may be prioritized over the precautionary category and the entertainment category, and the precautionary category may be prioritized over the entertainment category. In this manner, the apparatus 200 may determine to suppress outputting media elements 119 associated with the first condition 115 while the second condition 115 or third condition 115 are determined to be present. In some embodiments, the data store 107 includes one or more priority rankings of categories 117 that indicate a hierarchy by which conditions of different categories 117 may be prioritized.

In some embodiments, media elements 119 include effects that may be outputted to the passenger portion of the vehicle 101 to instruct or inform one or more passengers. For example, the media elements 119 may include respective program files for outputting audio effects, visual effects, tactile effects, and/or the like via one or more passenger computing devices 105B or other media sources located within the passenger portion of the vehicle 101. In some embodiments, an audible media element 119 (also referred to herein as an "audio element") includes one or more pre-recorded utterances of instructions, guidance, description, and/or the like. Additionally, or alternatively, in some embodiments, the apparatus 200 is configured to generate an audio element dynamically using a computer voice module, generative artificial intelligence model, and/or the like, which may be prompted based at least in part on vehicle data, a condition 115 determined to be satisfied by the vehicle data, a category 117 of the condition 115, and/or the like. Non-limiting examples of audio elements include entertainment information (e.g., POI descriptions, travel pathway information, entertainment options available, food items available, and/or the like), precautionary instructions (e.g., no smoking, depower devices, remain seated, buckle seatbelt, and/or the like), and emergency instructions (e.g., bracing positions, use of emergency exits and equipment, emergency communication information, and/or the like).

In some embodiments, a visible media element 119 (also referred to herein as a "visual element") includes one or more predefined images, videos, animations, and/or the like. For example, a visual element may include a geographic map comprising one or more POI locations and a location of the vehicle 101. As another example, a visual element may include a listing of rules or guidelines for passenger behavior. As another example, a visual element may include a diagram of emergency procedures, such as a proper bracing position, instructions for or against use of emergency equipment, and/or the like. In some embodiments, a tactile media element 119 includes one or more haptic patterns, intensities, and/or the like that may signal a passenger's attention, direct the gaze or movement of the passenger, and/or the like. For example, a computing device 105B may include one or more vibrational elements that may be activated to generate haptic effects for directing the gaze of a passenger to one or more regions, windows, or electronic displays. As another example, a tactile media element 119 may be outputted to awaken a passenger.

Additional example aspects of the vehicle data, conditions 115, categories 117, and media elements 119, are shown in the data architecture 300 depicted in FIG. 3 and described herein.

In some embodiments, the apparatus 200 is configured to obtain vehicle data 109A, 109' from the vehicle management system 102, computing devices 105A, 105B, external system 106, and/or the like. In various embodiments, the apparatus 200 is configured to perform workflows and processes herein to determine whether the vehicle data satisfies one or more conditions 115 and cause outputting of media elements 119 based at least in part on a satisfied condition 115 and associated category 117. In some embodiments, the apparatus 200 is configured to generate vehicle data 109B and/or the like based at least in part on recorded audio, images, video, and/or the like that is/are associated with the operator portion, the passenger portion, an environment external to the vehicle 101, and/or the like. For example, the apparatus 200 may obtain an audio recording of a vehicle operator and generate an operator command 113 based at least in part on the audio recording and a natural language processing module. As another example, the apparatus 200 may determine that images, video, and/or the like of a passenger portion shows a fire, a smoking passenger, or use of emergency equipment (e.g., exit doors, masks, fire suppressants, and/or the like). In such contexts, the apparatus 200 may perform image recognition processes to identify and classify visual content captured in the images, video, and/or the like.

In some embodiments, the apparatus 200 is configured to determine whether a condition 115 is satisfied based at least in part on vehicle data and one or more criterion associated with the condition 115. For example, the apparatus 200 may compare a vehicle status 111 to one or more thresholds or other criteria to determine if the vehicle status 111 matches or otherwise satisfies the threshold, criteria, and/or the like. In some embodiments the apparatus 200 determines a condition 115 to be satisfied based at least in part on receipt or generation of an operator command 113 confirming the presence of the condition 115. The apparatus 200 may determine satisfaction of multiple conditions 115 in a simultaneous or asynchronous manner. In some embodiments, the apparatus 200 is configured to determine or access a category 117 associated with a condition 115 that is determined to be satisfied by the vehicle data. For example, the apparatus 200 may access the data store 107 to determine whether a condition 115 is associated with a category of entertainment, precaution, or emergency. Further, the apparatus 200 may be configured to determine or access one or more media elements 119 associated with the satisfied condition 115.

In some embodiments, the apparatus 200 is configured to determine a co-occurrence or overlap of satisfaction of two or more conditions 115. In such instances, the apparatus 200 may determine a condition 115 to prioritize in the context of outputting media elements 119 to the passenger portion of the vehicle. In some embodiments, the apparatus 200 determines the condition 115 to prioritized based at least in part on the respective categories 117 with which the satisfied conditions 115 are associated. For example, the apparatus 200 may generate a priority ranking of the satisfied conditions based at least in part on the associated categories 117. In such contexts, the apparatus 200 may rank emergency-associated conditions ahead of all other conditions and rank precaution-associated conditions ahead of entertainment-associated emergency conditions.

In various embodiments, the apparatus 200 is configured to cause outputting of one or more media elements 119 on one or more computing devices 105B located in the passenger portion of the vehicle 101. For example, the apparatus 200 may cause rendering of visual information on one or more displays 121B, playback of audio effects on one or more audio devices 125B, and/or the like. In some embodiments, the apparatus 200 is configured to determine a subset of the passenger portion that is associated with the satisfied condition. For example, the apparatus 200 may determine one or more seats, rows, or columns of passengers that are associated with the condition 115. In some embodiments, the apparatus 200 is configured to cause outputting of a media element 119 on one or more computing devices 105B that are associated with the determined subset of the passenger portion. In this manner, the apparatus 200 may provide targeted assistance to individual passengers or groups of passengers.

Additional example functionality, workflows, and processes of the passenger assistance system 103 (e.g., embodied as one or more apparatuses 200) are shown in the workflow 400, sequence 500, and process 600 depicted in FIGS. 4, 5, and 6, respectively, and described herein.

In some embodiments, the passenger assistance system 103, vehicle management system 102, computing devices 105A, 105B, external system 106, and/or the like, are communicable over one or more communications network(s), for example the communications network(s) 150. It should be appreciated that the communications network 150 in some embodiments is embodied in any of a myriad of network configurations. In some embodiments, the communications network 150 embodies a public network (e.g., the Internet). In some embodiments, the communications network 150 embodies a private network (e.g., an internal, localized, and/or closed-off network between particular devices). In some other embodiments, the communications network 150 embodies a hybrid network (e.g., a network enabling internal communications between particular connected devices and external communications with other devices). In some embodiments, the communications network 150 embodies a satellite-based communication network. Additionally, or alternatively, in some embodiments, the communications network 150 embodies a radio-based communication network that enables communication between the apparatus 200, the vehicle management system 102, the external system 106, and/or the like. For example, the apparatus 200 may receive vehicle data from an external system 106 via a transponder, communication gateway, and/or the like. The communications network 150 in some embodiments may include one or more transponders, satellites, base station(s), relay(s), router(s), switch(es), cell tower(s), communications cable(s) and/or associated routing station(s), and/or the like. In some embodiments, the communications network 150 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 150. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 150, the various embodiments are not limited to this particular architecture. In other embodiments, one or more computing entities share one or more components, hardware, and/or the like, or otherwise are embodied by a single computing device such that connection(s) between the computing entities are over the communications network 150 are altered and/or rendered unnecessary.

FIG. 2 illustrates a block diagram of an example apparatus 200 that may be specially configured in accordance with at least some example embodiments of the present disclosure. The apparatus 200 may carry out functionality and processes described herein to automate vehicle passenger assistance at least in part by determining conditions that are satisfied by vehicle data and causing outputting of predefined media elements in a passenger portion of the vehicle. In some embodiments, the apparatus 200 includes a processor 201, memory 203, communications circuitry 205, input/output circuitry 207, and condition monitoring circuitry 209. In some embodiments, the apparatus 200 is configured, using one or more of the processor 201, memory 203, communications circuitry 205, input/output circuitry 207, and/or condition monitoring circuitry 209, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, controlling, modifying, outputting, restoring, processing, displaying, storing, determining, creating/generating, predicting, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., determining satisfaction of conditions, determining condition priority levels, causing output of predefined media elements, and/or the like). In some embodiments, the memory 203 is embodied as a data store 107 as shown in FIG. 1 and described herein. In some embodiments, the memory 203 includes vehicle data 109, conditions 115, categories 117, media elements 119, and/or the like, as further architected in FIG. 3 and described herein.

The processor 201 may be embodied in a number of different ways. For example, in some embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with providing conditional assistance and instruction to vehicle passengers. In some embodiments, the processor 201 includes hardware, software, firmware, and/or the like, that obtain vehicle data from vehicle management systems 102, external systems 106, and/or the like. For example, the processor 201 may obtain vehicle statuses from one or more vehicle management systems 102 configured to generate or measure vehicle speed, location, acceleration, health, and/or the like. As another example, the processor 201 may obtain operator commands from a computing device 105 associated with an operator of the vehicle 101. As another example, the process 201 may receive and store in the memory 203 conditions 115, categories 117, media elements 119, and respective associations therebetween. As another example, the processor 201 may generate conditions 115 based at least in part on data associated with operation of the vehicle 101, such as a travel pathway.

In some embodiments, the apparatus 200 includes input/output circuitry 207 that provides output to a user and, in some embodiments, receives an indication of a user input. In various embodiments, the user is an operator of a vehicle 101, where the operator may be aboard or remote from the vehicle 101. For example, in some contexts, the input/output circuitry 207 provides output to and receives input from one or more operator computing devices, ground station operators, and/or the like. Additionally, or alternatively, in some embodiments, the user includes passengers aboard the vehicle. For example, the input/output circuitry 207 may provide output to and receive input from one or more computing devices located in a passenger portion of a vehicle 101. In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, vehicle controls (e.g., steering, power, braking, and/or the like), a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, and/or the like). In some embodiments, the input/output circuitry 207 includes or utilizes a user-facing application to provide input/output functionality to a display of an operator computing device, passenger computing device, and/or the like.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 205 includes, for example, a network interface for enabling communications with a wired or wireless communications network, such as the network 150 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s). In some embodiments, the communications circuitry 205 enables transmission to and/or receipt of data from vehicle management systems 102, computing devices 105, and external systems 106 in communication with the apparatus 200. For example, the communications circuitry 205 may enable receipt of operator commands from a computing device 105 located in an operator portion of a vehicle 101. As another example, the communications circuitry 205 may enable transmission of data to a computing device located in a passenger portion of the vehicle 101.

The condition monitoring circuitry 209 includes hardware, software, firmware, and/or a combination thereof, that carry out processes for providing conditional guidance to passengers based at least in part on vehicle data. For example, in some contexts, the condition monitoring circuitry 209 includes hardware, software, firmware, and/or the like, that process vehicle data 109 to determine whether the vehicle data 109 meets one or more conditions 115. In some embodiments, the condition monitoring circuitry 209 includes hardware, software, firmware, and/or the like, that determine a category 117, media element 119, and/or the like with which a condition 115 is associated. In some embodiments, the condition monitoring circuitry 209 includes hardware, software, firmware, and/or the like, that determine a priority level of a condition 115 and/or priority ranking of a plurality of conditions 115 based at least in part on associated categories 117. For example, the condition monitoring circuitry 209 may determine whether to prioritize or suppress outputting a predefined media element 119 of a condition 115 based at least in part on the category 117 with which the condition 115 is associated and as compared to a category 117 of another condition 115 for which a predefined media element 119 is being outputted. In some embodiments, the condition monitoring circuitry 209 includes hardware, software, firmware, and/or the like, that cause outputting of predefined media elements 119 in a passenger portion of the vehicle 101. For example, the condition monitoring circuitry 209 may cause outputting of audio effects, visual effects, and/or the like via one or more computing devices located in a passenger portion of a vehicle 101. In some embodiments, the condition monitoring circuitry 209 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, and/or condition monitoring circuitry 209 are combinable. Additionally, or alternatively, in some embodiments, one or more of the sets of circuitry perform some or all of the functionality described associated with another component. For example, in some embodiments, two or more of the sets of circuitry 201-209 are combined into a single module embodied in hardware, software, firmware, and/or a combination thereof. Similarly, in some embodiments, one or more of the sets of circuitry, for example the memory 203, communication interface 205, and/or condition monitoring circuitry 209 is/are combined with the processor 201, such that the processor 201 performs one or more of the operations described above with respect to each of these sets of circuitry 203-209.

Example Data Architectures and Data Flows of the Disclosure

Having described example systems and apparatuses in accordance with embodiments of the present disclosure, example architectures of data in accordance with the present disclosure will now be discussed. In some embodiments, the systems and/or apparatuses described herein maintain data environment(s) that enable the workflows in accordance with the data architectures described herein. For example, in some embodiments, the systems and/or apparatuses described herein function in accordance with the data architectures depicted and described herein with respect to FIG. 3 and which may be maintained via the apparatus 200. Further, the methods, apparatuses, and computer program products may carry out functions in accordance with the workflow depicted and described herein with respect to FIG. 4.

FIG. 3. illustrates an example data architecture 300 in accordance with at least some example embodiments of the present disclosure. In some embodiments, vehicle data 109 includes vehicle statuses 111, operator commands 113, and/or the like. In some embodiments, vehicle statuses 111 include vehicle location, proximity to POI locations 305, heading, attitude, velocity, acceleration, pitch, travel phase (e.g., taxiing, ascending, cruising, descending, arriving, and/or the like), altitude, internal temperature, internal pressure, vibration level, component failure or malfunction, and/or the like. In some embodiments, vehicle statuses 111 include detect passenger behaviors or conditions including passenger position (e.g., standing, seated, buckled, unbuckled), passenger health, use of vehicle equipment (e.g., entertainment amenities, lavatory facilities, emergency equipment, and/or the like), emotional state, and/or the like. In some embodiments, passenger behaviors or conditions are determined based at least in part on recordings of a passenger portion of the vehicle 101, such as audio recordings or image data (e.g., images, video feeds, and/or the like). In some embodiments, vehicle statuses 111 include data obtained from one or more external systems 106. For example, vehicle statuses 111 may include weather reports, turbulence reports, vehicle traffic reports, and/or the like.

In some embodiments, operator commands 113 include inputs to vehicle controls, operator computing devices, and/or the like. For example, an operator command 113 may include a control input for adjusting the velocity or position of the vehicle 101. As another example, an operator command 113 may include a control input for reporting a component malfunction or failure. In some embodiments, an operator command 113 is configured to indicate one or more conditions 115. For example, an operator command 113 may be configured to indicate an emergency-related condition, such as wind shear, abnormal attitude, loss of control, and/or the like. As another example, an operator command 113 may be configured to indicate a precaution-related condition 115, such as preparation for a vehicle maneuver (e.g., change in vehicle altitude, angular orientation, velocity, and/or the like). As another example, an operator command 113 may be configured to indicate an entertainment-related condition 115, such as proximity of the vehicle 101 to POI locations 305 or availability and/or activation of in-vehicle entertainment features (e.g., films, tourism information, explanatory guides, trivia, and/or the like).

In various embodiments, a condition 115 includes a definition 301 associated with determining whether vehicle data 109 satisfies the condition. For example, a respective definition 301 may include a vehicle status 111, operator command 113, and/or the like that, when obtained, causes a positive determination that the condition 115 is present. A definition 301 may include one of more thresholds 303 to which vehicle data 109 may be compared to determine satisfaction of the condition 115. For example, a threshold 303 may be associated with a value or range of temperature, pressure, in-vehicle gas concentrations (e.g., oxygen, carbon dioxide, carbon monoxide, and/or the like), shock, vibration, acceleration, velocity, ascension rate, descension rate, turning rate, pitch, altitude, depth, noise level, and/or the like. In some embodiments, a definition 301 includes one or more actions, utterances, behaviors, and/or the like. For example, a definition 301 may include predefined passenger behaviors, actions, positions, and/or the like, which may be detected based at least in part on recordings of the passenger portion of the vehicle 101.

In some embodiments, a definition 301 includes one or more POI locations 305. A POI location 305 may include a geographical location of a landmark, city, physical construction, geological feature, political border, and/or the like. In some embodiments, the apparatus 200 is configured to obtain a travel pathway of a vehicle 101 and generate one or more POI locations based at least in part on the travel pathway. Additionally, or alternatively, the apparatus 200 is configured to provision the travel pathway to an external system 106 and receive, in response, one or more POI locations 305. Further, the apparatus 200 may obtain or generate one or more media elements 119 associated with the POI location 305, such as images or videos of the POI, audio descriptions of the POI, and/or the like.

In some embodiments, a condition 115 is associated with one of a plurality of categories 117, which may indicate a level of priority of the condition. In some embodiments, the categories 117 include emergency 309, precaution 311, entertainment 313, and/or the like. In some embodiments, conditions 115 that are associated with emergency 309 are assigned a highest level of priority such that their respective media elements 119 may be outputted to interrupt or suppress the output of media elements 119 associated with precaution 311 or entertainment 313. The conditions 115 associated with the emergency category may require proper passenger action immediately to mitigate a hazard, or prepare for a potential hazard, that imminently threatens passenger safety. In some embodiments, conditions 115 of the emergency category include fires, loss of vehicle control, depressurization of the vehicle 101, forecast or experience of turbulence, forecast or experience of collision, passenger health emergency, rapid changes in vehicle position or acceleration, unauthorized use of vehicle equipment (e.g., attempts to open emergency exit doors, activate fire suppressants, or deploy flotation devices), and/or the like.

In some embodiments, conditions 115 that are associated with precaution 311 are assigned a middle level of priority such that their respective media elements 119 may be outputted to interrupt or suppress the output of media elements 119 associated with entertainment 313. The conditions 115 associated with the precaution category may require passengers to perform actions ahead of time to prepare for preplanned events, such as vehicle position or acceleration changes, vehicle departure, vehicle landing, and/or the like. In some embodiments, conditions 115 of the precaution category include planned vehicle maneuvers including turns, ascensions, descensions, accelerations, landings, takeoffs, and/or the like in accordance with a travel pathway of the vehicle 101. In some embodiments, conditions 115 of the precaution category include deactivation of passenger computing devices, fastening seatbelts, seating passengers, and/or the like.

In some embodiments, conditions 115 that are associated with entertainment 313 are associated with a lowest level of priority such that their respective media elements 119 may be outputted in instances where no media elements 119 associated with emergency 309 or precaution 311 are present. The conditions associated with the entertainment category may provide travel entertainment information and activities to passengers to improve their travel experience. In some embodiments, conditions 115 of the entertainment category include proximity POI locations 305, visibility of POIs, availability of amenities (e.g., films, games, shows, consumables, and/or the like), movement of the vehicle 101 between segments of a travel pathway, and/or the like.

In various embodiments, a respective condition 115 is associated with one or more media elements 119. In some embodiments, media elements 119 include audio elements 315, visual elements 317, tactile elements 319, and/or the like. In some embodiments, audio elements 315 include audio recordings, such as recorded or computer-generated utterances of passenger instructions. In some embodiments, visual elements 317 include images, videos, animations, and/or the like, such as diagrams of anti-shock bracing positions, videos of a POI, mappings of the passenger portion and/or features of the vehicle 101, and/or the like. In some embodiments, tactile elements 319 include haptic patterns and intensities. For example, a tactile element 319 may include haptic patterns configured to indicate from which side of the vehicle 101 a POI may be observed. As another example, a tactile element 319 may include haptic patterns and intensities configured to awaken or alert one or more passengers. In some embodiments, tactile elements 319 may be outputted via a passenger computing device or infrastructure of the vehicle 101, such as a seatbelt, seat, flooring section, and/or the like.

In some embodiments, the data architecture 300 includes one or rankings 314 configured to indicate hierarchies of priority amongst the categories 117, conditions 115, and/or the like. For example, a ranking 314 may be a data object that encodes a hierarchical relationship between the categories of emergency 309, precaution 311, and entertainment 313. In such contexts, the ranking 314 may assign emergency 309 to a highest level of priority and entertainment 313 to a lowest level of priority. For example, emergency 309 may be a top-ranked entry of the ranking 314. As another example, a ranking 304 may encode a hierarchical relationship between conditions 115 assigned to the same category 117. In such contexts, the ranking 314 may assign a highest level of priority to conditions associated with the greatest immediate hazard to passenger safety (e.g., fire, depressurization, loss of vehicle integrity).

FIG. 4 illustrates an example workflow 400 for conditional passenger guidance. In various embodiments, the workflow 400 includes the passenger assistance system 103 receiving and processing vehicle statuses 111 from a vehicle management system 102, vehicle statuses 111' from one or more external systems 106, operator commands 113 from computing devices 105A in an operator portion 404, and/or the like. For example, the passenger assistance system 103 may receive from the vehicle management system 102 one or more system failure reports including statuses of vehicle controls, propulsion, power, interion environment regulation, and/or the like. As another example, the passenger assistance system 103 may receive weather reports generated by remote weather monitoring services, where the weather reports may indicate turbulence factors, such as wind shear. As another example, the passenger assistance system 103 may receive terrain warnings from onboard ground proximity warning systems or offboard radar systems. As another example, the passenger assistance system 103 may obtain values of vehicle altitude, attitude, geographical location, proximity to POI locations, and/or the like from onboard systems (e.g., navigation systems, air data systems, inertial reference systems, and/or the like) or an external system, such as a ground station. In another example, the passenger assistance system 103 may receive from the computing device 105A an instruction to direct passengers in performing emergency safety procedures (e.g., bracing, vehicle egress, oxygen regulation, and/or the like).

In various embodiments, the workflow 400 includes the passenger assistance system 103 determining satisfaction of a condition based at least in part on the obtained data and causing output of one or more media elements 119 in a passenger portion 402 of the vehicle 101. For example, based at least in part on the condition determined to be satisfied, the passenger assistance system 103 may cause output of audible passenger instructions, visual passenger guidance, and/or the like via one or more computing devices 105B located in the passenger portion 402. In an aerial context, the computing devices 105B may include media devices integrated into an air cabin, such as speaker systems, seat-mounted monitors, overhead monitors, and/or the like.

In some embodiments, the passenger assistance system 103 suspends output of a first media element 119 such that a second media element 119 associated with greater priority may be outputted to the passenger portion 402. In some embodiments, the passenger assistance system 103 causes output of multiple media elements 119 asynchronously, simultaneously, and/or the like. The multiple media elements 119 may be associated with the same or different conditions. Additionally, or alternatively, the multiple media elements 119 may be outputted in different subsections of the passenger portion 402. For example, a first media element 119 may be outputted via a subset of passenger computing devices 105B located in a first subsection, and a second media element 119 may be outputted via a second subset of passenger computing devices 105B located in a separate subsection. In this manner, the passenger assistance system 103 may supplement the services and contributions of multiple human assistants. In doing so, the passenger assistance system 103 may increase the throughput, efficiency, and specificity of passenger services as compared to manual approaches.

FIG. 5 illustrates an example sequence 500 of conditional passenger guidance in accordance with at least some example embodiments of the present disclosure.

In some embodiments, the sequence 500 includes processing received data for condition classification (indicium 503). In various embodiments, the received data includes vehicle data 109 including one or more vehicle statuses 111, one or more operator commands 113, and/or the like. In some embodiments, the vehicle data 109 includes a location of the vehicle 101, a proximity of the vehicle 101 to a POI location, and/or the like. In some embodiments, the vehicle data 109 includes measurements of change in vehicle acceleration, altitude, ascent rate, descent rate, vibration, temperature, pressurization, and/or the like. In some embodiments, the vehicle data 109 includes indications of component or system failure, turbulent or other adverse weather conditions, terrain or vehicle collisions, and/or the like. In some embodiments, the vehicle data 109 includes indications of travel pathway phase, such as taxi, takeoff, cruise, descent, landing, gate arrival, and/or the like. In some embodiments, the vehicle data 109 include operator commands for indicating presence of a condition 115 and initiating output of media elements 119 associated with the condition 115.

In some embodiments, the sequence 500 includes determining whether a safety-critical condition (e.g., a condition 115 of an emergency category 309) is detected based at least in part on the received data (indicium 506). In some embodiments, in response to detection of a safety-critical condition, the sequence 500 includes causing output of a predefined safety critical instruction with priority over output of any instructions associated with precautionary conditions or entertainment conditions (indicium 509). In some embodiments, in response to determining that the vehicle data 109 does not satisfy any safety-critical conditions, the workflow includes evaluating the vehicle data 109 in the context of a precaution category of conditions. In some embodiments, the sequence 500 includes determining whether a precaution condition is detected based at least in part on the received data (indicium 512). In some embodiments, in response to detection of a precautionary condition, the sequence 500 includes causing output of a predefined precautionary instruction with priority over output of any instructions associated with entertainment conditions (indicium 515).

In some embodiments, in response to determining that the vehicle data 109 does not satisfy any precaution conditions, the workflow includes evaluating the vehicle data 109 in the context of an entertainment category of conditions. For example, the sequence 500 includes determining whether an entertainment condition is detected based at least in part on the received data (indicium 518). In some embodiments, in response to detection of an entertainment condition, the sequence 500 includes causing output of a predefined entertainment media element (e.g., unless any precautionary or safety-critical instructions are currently being outputted) (indicium 521). In some embodiments, the sequence 500 includes determining whether an exit condition is detected based at least in part on the received data (indicium 524). In some embodiments, the exit condition includes completion of a travel pathway, disembarkation of passengers from the vehicle, deactivation of the apparatus 200 by the vehicle operator, and/or the like.

Example Processes of the Disclosure

Having described example systems and apparatuses, data architectures, and data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 6 illustrates a flowchart depicting operations of an example process 600 for providing conditional passenger assistance in accordance with at least some example embodiments of the present disclosure. In some embodiments, the process 600 is embodied by computer program code stored on a non-transitory computer-readable storage medium of a computer program product configured for execution to perform the process as depicted and described. Additionally, or alternatively, in some embodiments, the process 600 is performed by one or more specially configured computing devices, such as apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the apparatus 200 is in communication with one or more internal or external apparatus(es), system(s), device(s), and/or the like, to perform one or more of the operations as depicted and described. For example, the apparatus 200 may communicate with one or more vehicle management systems 102, computing devices 105A located in an operator portion of the vehicle 101, computing devices 105B located in a passenger portion of the vehicle 101, external systems 106, and/or the like to perform one or more operations of the process 600.

At operation 603, the apparatus 200 includes means such as the condition monitoring circuitry 209, the communications circuitry 205, the input/output circuitry 207, the processor 201, and/or the like, or a combination thereof, that obtain vehicle data. For example, the apparatus 200 may obtain vehicle data 109 from one or more vehicle management systems 102, computing devices 105A, computing devices 105B, external systems 106, and/or the like. For example, the apparatus 200 may receive a vehicle location from a vehicle management system 102. As another example, the apparatus 200 may receive a wind shear alert from a remote weather monitoring service, a radar system, a second vehicle 101, and/or the like. As another example, the apparatus 200 may receive an operator command 113 to output media elements 119 for an indicated condition 115.

In some embodiments, the apparatus 200 is configured to generate additional vehicle data 109 based at least in part on initially obtained vehicle data 109. For example, the apparatus 200 may receive image data (e.g., photos, video, and/or the like) from one or more computing devices or sensors aboard the vehicle 101. The apparatus 200 may perform one or more image recognition techniques on the image data to generate one or more vehicle statuses 111, such as passenger positions, passenger behaviors, usage of vehicle equipment, and/or the like. As another example, the apparatus 200 may receive an audio recording associated with an operator portion of the vehicle 101, the audio recording comprising utterances from a vehicle operator. The apparatus 200 may perform natural language processing to generate an operator command 113 based at least in part on the audio recording.

In some embodiments, the apparatus 200 is configured to obtain a travel pathway of the vehicle 101 and generate or request from an external system 106 one or more POI locations based at least in part on the travel pathway. In some embodiments, the apparatus 200 is further configured to generate respective conditions 115 based at least in part on the one or more POI locations. For example, the apparatus 200 may generate a condition comprising a location of a POI and a threshold proximity to which a location of the vehicle 101 may be compared.

In some embodiments, the apparatus 200 is configured to cause rendering of a GUI on a display of an operator's computing device 105B. The GUI may include one or more selectable fields, which may be associated with different operator commands 113 and conditions 115. In some embodiments, the apparatus 200 receives an operator command 113 from the computing device 105B in response to the GUI receiving a user input selecting a selectable field.

At operation 606, the apparatus 200 includes means such as the condition monitoring circuitry 209, the communications circuitry 205, the input/output circuitry 207, the processor 201, and/or the like, or a combination thereof, that determine one or more conditions satisfied by the vehicle data. For example, the apparatus 200 may determine one or more conditions 115 satisfied by the vehicle data 109. In some embodiments, the apparatus 200 is configured to compare vehicle data 109 to respective definitions of one or more conditions 115. For example, the apparatus 200 may compare a vehicle status 111 to one or more thresholds or other criteria associated with positive determination of condition presence. In some contexts, the apparatus 200 may determine that the vehicle 101 is located within a threshold range of a POI location, a wind shear-prone region, a destination, and/or the like. In some embodiments, the apparatus 200 determines a condition 115 that is indicated by an operator command 113. In some embodiments, the apparatus 200 determines that vehicle data 109 (or one or more subsets of the vehicle data 109) satisfies multiple conditions 115. It will be understood and appreciated that the apparatus 200 may perform operations 603-606 on a continuous basis such that the apparatus 200 may determine conditions 115 and output media elements 119 in substantially real-time and, in some embodiments, in parallel with output of other media elements 119 of previously determined conditions 115.

At operation 609, the apparatus 200 optionally includes means such as the condition monitoring circuitry 209, the communications circuitry 205, the input/output circuitry 207, the processor 201, and/or the like, or a combination thereof, that determine a priority of the conditions determined to be satisfied at operation 606. For example, the apparatus 200 may determine a priority ranking of conditions 115 determined to be satisfied at operation 606. As another example, the apparatus 200 may determine a priority ranking of a condition 115 determined to be satisfied in a current iteration of operation 606 and one or more conditions 115 previously determined to be satisfied and for which media elements 119 are currently being outputted. In various embodiments, the conditions 115 are associated with respective categories 117 including entertainment, precaution, or emergency. In some embodiments, the apparatus 200 is configured to determine a respective category 117 of the conditions 115 and generate a priority ranking of the conditions 115 based at least in part on the categories 117. For example, the apparatus 200 may determine that a first satisfied condition 115 is associated with the emergency category and a second satisfied condition 115 is associated with the precaution or entertainment category. In such contexts, the apparatus 200 may generate a priority ranking in which a top-ranked (e.g., highest priority) entry comprise the first satisfied condition 115.

At operation 612, the apparatus 200 includes means such as the condition monitoring circuitry 209, the communications circuitry 205, the input/output circuitry 207, the processor 201, and/or the like, or a combination thereof, that cause output of one or more predefined media elements via one or more computing devices in a passenger portion of the vehicle. For example, based at least on one or more conditions 115, a priority ranking, and/or the like, the apparatus 200 may cause output of one or more media elements 119 via one or more computing devices 105B located in a passenger portion of the vehicle 101.

In some embodiments, the apparatus 200 obtains from the data store 107 one or more media elements 119 that are associated with the satisfied condition 115. The apparatus 200 may provision the media elements 119 to one or more computing devices 105B for outputting. For example, the apparatus 200 may cause output of audio elements comprising an announcement and/or description of a nearby POI. Additionally, or alternatively, the apparatus 200 may cause rendering of an image, video, and/or the like of the POI on a display of the computing device 105B. Additionally, or alternatively, the apparatus 200 may cause the computing device 105B to output a tactile element configured to awaken or alert a passenger. In another example, the apparatus 200 may cause output of an audio element comprising instructions to take a bracing position and a visual element comprising a diagram of the bracing position. In another example, the apparatus 200 may cause output of an audio element instructing passengers to seat themselves and remain buckled within their seats.

In some embodiments, the apparatus 200 is configured to cause output of the media element 119 on a subset of computing devices 105B. In some embodiments, the apparatus 200 determines a subset of a passenger portion that is associated with the condition 115. The apparatus 200 may cause output of the media element on a subset of computing devices 105B located within the subset of the passenger portion. For example, the apparatus 200 may determine that the vehicle 101 has moved within a threshold range of a POI location. The apparatus 200 may further determine a subset of the passenger portion of the vehicle 101 from which the POI may be observed (e.g., one or more seats, seat rows, seat columns and/or the like). The apparatus 200 may determine a subset of computing devices 105B that are located within a subset of the passenger portion. The apparatus 200 may limit output of a media element to the subset of computing devices 105B such that only passengers capable of observing the POI without moving from their seats are alerted. As another example, the apparatus 200 may determine a subset of passengers who are unbuckled, unseated, unruly, and/or the like, and may limit outputting of media elements 119 to a subset of computing devices 105B that is located proximate to the passengers.

At operation 615, the apparatus 200 optionally includes means such as the condition monitoring circuitry 209, the communications circuitry 205, the input/output circuitry 207, the processor 201, and/or the like, or a combination thereof, that determine whether a second condition with greater priority is satisfied during output of a predefined media element associated with a first condition. For example, during output of a predefined media element 119 associated with a first condition 115, the apparatus 200 may determine that additional obtained vehicle data 109 meets a second condition 115. The apparatus 200 may determine that the second condition 115 is associated with a category 117 having greater priority than a category 117 with which the first condition 115 is associated. For example, the second condition 115 may be associated with a precaution category, and the first condition 115 may be associated with an entertainment category. In response to such a determination, the process may proceed to operation 615. Alternatively, in response to the apparatus 200 determining that the second condition 115 is associated with a condition 115 having lower priority than the category 117 of the first condition 115, the process 600 may proceed to operation 621.

At operation 618, the apparatus 200 optionally includes means such as the condition monitoring circuitry 209, the communications circuitry 205, the input/output circuitry 207, the processor 201, and/or the like, or a combination thereof, that suspend output of the media element 119 associated with the first condition 115 and cause output of another predefined media element associated with the second condition. For example, the apparatus 200 may suspend output of a first predefined media element 119 that is associated with a category 117 of lower priority, and the apparatus 200 may cause output of a second predefined media element 119 that is associated with a category 117 of higher priority. In this manner, the apparatus 200 may prioritize outputting media elements of emergency-based conditions over those of precautionary-based conditions and entertainment-based conditions. Further, the apparatus may prioritize outputting media elements of precautionary-based conditions over those of entertainment-based conditions.

At operation 621, the apparatus 200 optionally includes means such as the condition monitoring circuitry 209, the communications circuitry 205, the input/output circuitry 207, the processor 201, and/or the like, or a combination thereof, that suppress output of the predefined media element 119 that is associated with the second condition 115 due to the second condition 115 being associated with a category 117 of lower priority as compared to a category 117 with the which the first condition 115 is associated. For example, during output of a predefined media element 119 associated with a first condition 115 associated with an emergency category, the apparatus 200 may suppress output of one or more predefined media elements 119 that are associated with a second condition 115 based at least in part on a determination that the second condition 115 is associated with a lower priority category 117, such as a precaution or entertainment category.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
- obtaining vehicle data associated with operation of a vehicle;
- determining the vehicle data satisfies at least a first condition and a second condition of a plurality of conditions stored in at least one data store, wherein:
  - respective subsets of the plurality of conditions are associated with one of a plurality of categories comprising emergency, precaution, and entertainment;
  - the first condition is associated with an emergency category;
  - the second condition is associated with at least one of a precaution category or an entertainment category; and
  - the at least one data store further comprises a ranking of the plurality of categories by priority, a top-ranked entry of the ranking comprising the emergency category; and
- causing at least one computing device in a passenger portion of the vehicle to output a predefined media element associated with the first condition based at least in part on the ranking.

2. The method of claim 1, wherein:
- the predefined media element comprising at least one audio element.

3. The method of claim 1, wherein:
- the predefined media element comprising at least one visual element.

4. The method of claim 1, wherein:
- the predefined media element comprises at least one tactile element.

5. The method of claim 1, wherein:
- the predefined media element comprises at least one audio element and at least of a visual element or a tactile element.

6. The method of claim 1, wherein:
- the vehicle data comprises an operator command obtained from a computing device in a remaining portion of the vehicle that is separate from the passenger portion of the vehicle.

7. The method of claim 6, further comprising:
- receiving, from the computing device in the remaining portion of the vehicle, an audio recording of the remaining portion of the vehicle, the audio recording comprising an utterance from an operator of the vehicle; and
- generating, via natural language processing, the operator command based at least in part on the audio recording.

8. The method of claim 1, wherein:
- the vehicle data comprises a vehicle status;
- the vehicle status comprises a current location of the vehicle and a travel pathway comprising at least one point of interest (POI) location;
- the method further comprises:
  - determining one of the plurality of conditions is satisfied in response to a determination that the current location of the vehicle is within a threshold range of a respective POI location; and the predefined media element comprises at least one of an auditory output or a visual output indicating the POI location relative to the current location of the vehicle.

9. The method of claim 8, wherein:

the at least one computing device in the passenger portion of the vehicle comprises a plurality of computing devices distributed throughout the passenger portion; and the method further comprises:

determining a subset of the passenger portion of the vehicle from which the POI location is observable;

determining a subset of the plurality of computing devices associated with the subset of the passenger portion of the vehicle; and limiting output of the predefined media element to the subset of the plurality of computing devices.

10. The method of claim 1, wherein:

the vehicle data comprises a vehicle status; and the method further comprises:

obtaining the vehicle status from at least one system aboard the vehicle, wherein:

the vehicle status comprises a weather report;

one of the plurality of conditions comprises wind shear; and the first condition is associated with the emergency category.

11. The method of claim 1, further comprising:

during output of the predefined media element associated with the first condition, determining that additional vehicle data satisfies a third condition, wherein the third condition is associated with a category having lower priority than the emergency category; and suppressing output of a predefined media element associated with the third condition based at least in part on the ranking.

12. The method of claim 1, wherein the ranking further encodes a hierarchical relationship between conditions assigned to the same category, and the ranking assigns a highest level of priority to conditions associated with a greatest immediate hazard to passenger safety.

13. An apparatus comprising at least one processor and at least one non-transitory memory having computer-coded instructions stored thereon that, in execution with at least one processor, cause the apparatus to:

obtain vehicle data associated with operation of a vehicle;

determine the vehicle data satisfies at least a first condition and a second condition of a plurality of conditions stored in at least one data store, wherein:

respective subsets of the plurality of conditions are associated with one of a plurality of categories comprising emergency, precaution, and entertainment;

the first condition is associated with an emergency category;

the second condition is associated with at least one of a precaution category or an entertainment category; and the at least one data store further comprises a ranking of the plurality of categories by priority, a top-ranked entry of the ranking comprising the emergency category; and cause at least one computing device in a passenger portion of the vehicle to output a predefined media element associated with the first condition based at least in part on the ranking.

14. The apparatus of claim 13, wherein:

the vehicle data comprises an operator command; and the computer-coded instructions, in execution with the at least one processor, further cause the apparatus to:

cause rendering of a graphical user interface (GUI) on a display of a computing device in an operator portion of the vehicle, the GUI comprising at least one selectable field; and receive the operator command from the computing device in the operator portion of the vehicle, wherein the operator command is based at least in part on a user input to the GUI.

15. The apparatus of claim 13, wherein:

the first condition is associated with the category of emergency or the category of precaution; and the computer-coded instructions, in execution with the at least one processor, further cause the apparatus to:

suspend outputting of a predefined media element that is associated with a third condition based at least in part on the third condition being associated with the category of entertainment.

16. The apparatus of claim 13, wherein:

the computer-coded instructions, in execution with the at least one processor, further cause the apparatus to:

generate at least a subset of the plurality of conditions based at least in part on a travel pathway associated with the vehicle.

17. The apparatus of claim 16, wherein:

the travel pathway comprises at least one POI location.

18. The apparatus of claim 13, wherein:

the computer-coded instructions, in execution with the at least one processor, further cause the apparatus to:

receive the vehicle data from an external system located outside of the vehicle.

19. The apparatus of claim 18, wherein:

the external system comprises at least one of a remote weather service, a vehicle traffic system, a radar system, or a second vehicle.

20. A computer program product comprising at least one non-transitory computer-readable storage medium having computer program code stored thereon that, in execution with at least one processor, is configured to:

obtain vehicle data associated with operation of a vehicle;

determine the vehicle data satisfies at least a first condition and a second condition of a plurality of conditions stored in at least one data store, wherein:

respective subsets of the plurality of conditions are associated with one of a plurality of categories comprising emergency, precaution, and entertainment;

the first condition is associated with an emergency category;

the second condition is associated with at least one of a precaution category or an entertainment category; and the at least one data store further comprises a ranking of the plurality of categories by priority, a top-ranked entry of the ranking comprising the emergency category; and cause at least one computing device in a passenger portion of the vehicle to output a predefined media element associated with the first condition based at least in part on the ranking.

* * * * *